United States Patent [19]

Keogh

[11] 4,444,957

[45] * Apr. 24, 1984

[54] REACTION PRODUCTS OF A DIFUNCTIONAL COMPOUND AND AN ORGANO TITANATE AND THE USE THEREOF IN THE PREPARATION OF CURED PRODUCTS BASED ON ALKYLENE-ALKYL ACRYLATE COPOLYMERS

[75] Inventor: Michael J. Keogh, Bridgewater, N.J.

[73] Assignee: Union Carbide Corporation, Danbury, Conn.

[*] Notice: The portion of the term of this patent subsequent to Sep. 28, 1999 has been disclaimed.

[21] Appl. No.: 402,981

[22] Filed: Aug. 3, 1982

Related U.S. Application Data

[63] Continuation-in-part of Ser. No. 106,502, Dec. 26, 1979, Pat. No. 4,351,926.

[51] Int. Cl.³ ............................................. C08F 8/42
[52] U.S. Cl. .................................................... 525/370
[58] Field of Search .............................. 525/330.6, 370

[56] References Cited

U.S. PATENT DOCUMENTS

| 3,491,075 | 1/1970 | Dekking | 525/70 |
| 3,904,572 | 9/1975 | Huang et al. | 524/555 |
| 3,969,434 | 7/1976 | Powell et al. | 526/14 |
| 4,005,247 | 1/1977 | Graham | 526/15 |
| 4,012,567 | 3/1977 | Loveless | 526/48 |
| 4,020,214 | 4/1977 | MacKenzie, Jr. | 428/389 |
| 4,042,766 | 8/1977 | Tatsukami et al. | 526/47 |
| 4,185,051 | 1/1980 | McKenna, Jr. et al. | 525/370 |
| 4,292,231 | 9/1981 | Gabriel | 428/40 |

*Primary Examiner*—Paul R. Michl
*Attorney, Agent, or Firm*—James C. Arvantes; Robert C. Brown

[57] ABSTRACT

Reaction products of a difunctional compound and an organotitanate, process for the preparation thereof and the use of these reaction products as crosslinking agents in the preparation of cured products based on alkylene-alkyl acrylate copolymers. The cured products are especially useful as protective coatings about wires and cables.

15 Claims, No Drawings

REACTION PRODUCTS OF A DIFUNCTIONAL COMPOUND AND AN ORGANO TITANATE AND THE USE THEREOF IN THE PREPARATION OF CURED PRODUCTS BASED ON ALKYLENE-ALKYL ACRYLATE COPOLYMERS

This application is a continuation-in-part of application Ser. No. 106,502, filed Dec. 26, 1979 now U.S. Pat. No. 4,351,926 granted Sept. 28, 1982.

SUMMARY OF THE INVENTION

The present invention relates to reaction products of a difunctional compound and an organo titanate and the use thereof as crosslinking agents in the preparation of cured products based on alkylene-alkyl acrylate copolymers. The cured products are especially useful as protective coatings about wires or cables.

BACKGROUND OF THE INVENTION

Prior methods of curing, i.e. crosslinking, polymers include use of various peroxides. A mixture of polymer and a small amount of peroxide is prepared, and the mixture is cured with heat. The difficulty with this method is that the curing process generates volatile compounds which vaporize at the curing temperature if the pressure is low. Hence, unless the curing is carried out at high pressure in expensive pressure chambers, the cured polymer will have voids caused by the vaporized material.

Another method of curing polymers is by use of electron beams. However, this method requires expensive electron beam generating apparatus, and is unacceptably slow if the polymer being cured is thick.

U.S. Pat. No. 3,646,155 (Scott) discloses a water curable polymer. However, its manufacturer recommends use of relatively expensive silane compounds and intimate contact with water to effect crosslinking.

OBJECTS

Accordingly, it is an object of this invention to provide crosslinking agents for crosslinking alkylene-alkyl acrylate copolymers without the use of high pressure during cure.

It is another object of this invention to provide heat-cured alkylene-alkyl acrylate copolymers which are useful as coatings about wire or cable.

It is a further object of this invention to provide a process for the preparation of curable alkylene-alkyl acrylate copolymers without the use of silane compounds as curing agents.

DESCRIPTION OF THE INVENTION

These and other objects are accomplished by the present invention, one aspect of which comprises preparing a crosslinking agent by reacting a mixture containing:

(a) a difunctional compound having the formula:

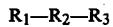

wherein $R_1$ and $R_3$ are independently selected from the group consisting of —OH, —SH,

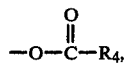

wherein $R_4$ is $C_1$ to $C_{20}$ hydrocarbon; $R_2$ is a divalent organic radical terminated with other than aryl and (b) from 5 to 100 parts by weight, based on 100 parts by weight of the difunctional compound, of an organo titanate.

In carrying out the reaction, temperatures on the order of 25° C. to 250° C. are conveniently employed.

Also, it is preferred to remove volatile material from the reaction product prior to use.

The reaction product or adduct produced, as previously stated, is useful as a crosslinking agent for alkylene-alkyl acrylate copolymers. The reaction product can be used per se or in admixture with an inert or nonreactive polymer which serves as a carrier.

Another aspect of the present invention relates to a process for preparing a heat curable alkylene-alkyl acrylate copolymer by reacting a mixture containing:

(a) a difunctional compound having the formula:

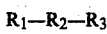

wherein $R_1$ and $R_3$ are independently selected from the group consisting of —OH, —SH,

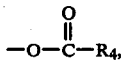

wherein $R_4$ is $C_1$ to $C_{20}$ hydrocarbon; $R_2$ is a divalent organic radical terminated with other than aryl and from 5 to 1,000 parts by weight, based on 100 parts by weight of the difunctional compound, of an organo titanate at a temperature of from 25° C. to 250° C. to produce a reaction product, (b) removing volatile material from the step (a) reaction product, and (c) reacting the devolatilized reaction product with an alkylene-alkyl acrylate copolymer.

In another aspect of the present invention, a heat-curable alkylene-alkyl acrylate copolymer is prepared by reacting a mixture containing:

(a) an alkylene-alkyl acrylate copolymer, (b) from 0 to 10 parts by weight, based on 100 parts by weight of the copolymer, of a difunctional compound having the formula:

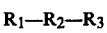

wherein $R_1$ and $R_3$ are independently selected from the group consisting of —OH, —SH,

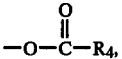

wherein $R_4$ is $C_1$ to $C_{20}$ hydrocarbon; $R_2$ is a divalent organic radical terminated with other than aryl, and (c) from 0.1 to 10 parts by weight, based on 100 parts by weight of copolymer, of a titanium chelate.

Curing of a heat-curable copolymer so produced, requires curing at elevated pressure, generally on the order of about 5 to about 50 psig in order that a void free polymer be obtained. Silane compounds, however, are not required.

Crosslinked products of the heat-curable copolymers contain repeating units of:

(a) alpha olefin units having the formula:

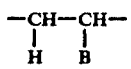

wherein B is selected from the group consisting of hydrogen, $C_1$ to $C_{16}$ alkyl, $C_6$ to $C_{12}$ aryl, $C_7$ to $C_{16}$ alkaryl or combinations thereof, said alpha olefin units being present in the copolymer to the extent of at least 22 weight percent;

(b) crosslinked bridges of the formula:

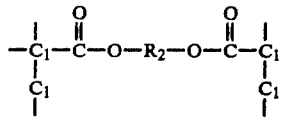

wherein $C_1$ is a carbon atom in the polymer chain, and $R_2$ is a divalent organic radical terminated with other than aryl.

The present invention is predicated upon the discovery that when alkylene-alkyl acrylate copolymer, difunctional compound, and certain titanium compound are reacted, there results a heat-curable polymer that does not necessarily require high pressure curing. While not wishing to be bound by any particular theory, it is believed that the cured polymer is formed as follows:

First, the titanate, typically a titanate ester, reacts with the difunctional compound to form a different titanate ester and volatile alcohol or ester. The alcohol or ester may be removed during the initial compounding step before curing and even before the polymer is molded or extruded to its final form. The structures of the esters so formed are dependent on several factors including the relative mole ratio of titanate to difunctional compound, reaction time and temperature. Upon the application of heat, the esters formed in the first reaction cure the polymer. Overall, reactions occurring may be summarized as follows for typical reactants in accordance with the invention:

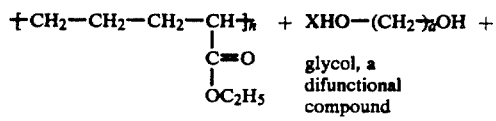

ethylene-ethyl
acrylate copolymer

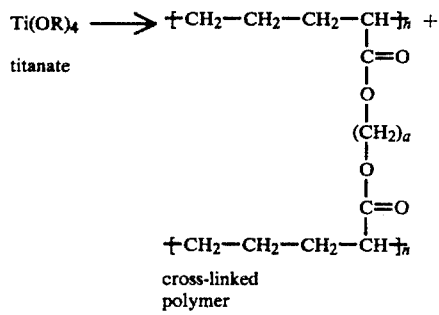

cross-linked
polymer

Ti(OR)$_{4-2x}$(OC$_2$H$_5$)$_{2x}$ + 2 X R—OH

Non-volatile titanate   Volatile alcohol removed
before curing

DETAILED DESCRIPTION OF THE INVENTION

The invention will now be described in terms of its key ingredients: copolymer, difunctional compound and titanate. Then the preferred means of processing the ingredients into crosslinkable polymers will be discussed.

THE ALKYLENE-ALKYL ACRYLATE COPOLYMER

As used throughout the present specification and claims, the term "alkylene-alkyl acrylate copolymer" is intended to mean a copolymer formed by copolymerizing (a) olefin monomer having the formula:

wherein B is hydrogen, $C_1$ to $C_{16}$ alkyl, aryl, alkaryl or combinations thereof, including but not limited to ethylene, propylene, higher alpha olefins, and styrene.

(b) alkyl acrylate monomer having the formula:

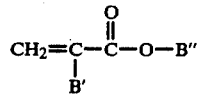

wherein B' is hydrogen or $C_1$ to $C_5$ alkyl and B" is $C_1$ to $C_{18}$ alkyl.

The preferred alkylene-alkyl acrylate copolymer is ethylene-ethyl acrylate copolymer containing from about 1 to about 50 percent by weight ethyl acrylate. The most preferred copolymer is ethylene-ethyl acrylate copolymer containing from 2 to about 20 percent by weight ethyl acrylate.

The alkylene-alkyl acrylate copolymers generally have a density (ASTM 1505 test procedure with conditioning as in ASTM D-148-72) of about 0.90 to 0.96 and a melt index (ASTM D-1238 at 44 psi. tested pressure) of about 0.5 to 500 decigrams per minute.

Another preferred alkylene-alkyl acrylate copolymer is ethylene-butyl acrylate copolymer. Other monomers may be copolymerized with the olefin and alkyl acrylate. Hence, ethylene-alkyl acrylate-acrylic acid terpolymers are also acceptable and included in the definition of "alkylene-alkyl acrylate" as used in the present specification and claims.

THE DIFUNCTIONAL COMPOUNDS

The difunctional compounds are of the general formula:

$$R_1—R_2—R_3$$

wherein $R_1$ and $R_3$ are independently selected from the group consisting of —OH, —SH,

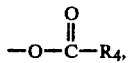

wherein $R_4$ is $C_1$ to $C_{20}$ hydrocarbon. $R_2$ is a divalent organic radical terminated with other than aryl. Hence $R_2$ includes, but is not limited to $C_2$–$C_{20}$ unsubstituted hydrocarbon, including alkyl, cycloalkyl, and alkaryl, $C_2$-$C_{20}$ hydrocarbon partially substituted by halogen, or

wherein m is an integer of 0 to 20, $Y^1$ to $Y^{m+2}$ are independently selected from divalent $C_2$-$C_{20}$ hydrocarbon, and $C_2$-$C_{20}$ hydrocarbon partially substituted by halogen; and $X^1$ to $X^{m+1}$ are independently selected from the group consisting of O, S, N, Z, and combinations thereof wherein Z is $C_1$ to $C_{20}$ alkyl.

Preferred difunctional compounds are:

HO—$(CH_2)_a$—OH, wherein a is an integer of 2 to 20;

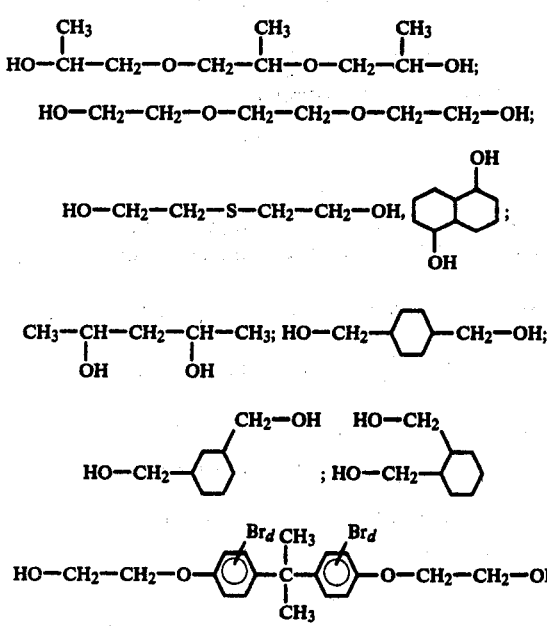

wherein d is an integer of 1 to 4; dibromoneopentyl glycol; and

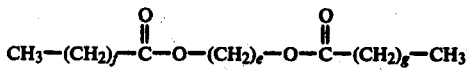

wherein e is an integer of 2 to 20; and f and g are integers of 0 to 18.

However, difunctional compounds wherein $R_2$ is terminated by aryl are not acceptable. Hence, bisphenol-A, having the formula:

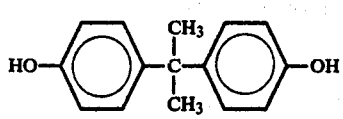

is unacceptable, because its $R_2$

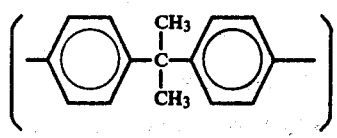

terminates with aryl.

THE ORGANOTITANATE

As used throughout the present specification and claims, the terms "organotitanate" is intended to mean a compound of the formula:

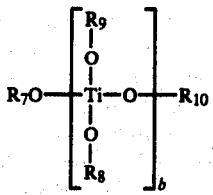

wherein $R_7$, $R_8$, $R_9$ and $R_{10}$ are independently selected from the group consisting of hydrogen, alkyl, cycloalkyl, aryl, alkaryl, aralkyl, of 1 to 20 carbon atoms, lactyl and acyl of the formula

$$R_{11}-\overset{|}{C}=O$$

wherein $R_{11}$ is $C_1$ to $C_{20}$ alkyl and b is an integer of from 1 to 100, with the proviso that not all of $R_7$, $R_8$, $R_9$ and $R_{10}$ be H, acyl, or alkaryl. These organo titanates are commercially available materials and are prepared according to the procedures as set forth in U.S. Pat. No. 2,984,641, the disclosure of which is incorporated herein by reference.

Preferred titanates are: tetramethyl titanate, tetraethyl titanate, tetraisopropyl titanate, tetrabutyl titanate, tetraoctyl titanate, tetra stearyl titanate, isopropyl tri (lauryl-myristyl) titanate, and combinations thereof.

The most preferred organo titanates are tetrabutyl titanate and tetraisopropyl titanate.

THE TITANIUM CHELATES

One aspect of the invention uses titanium chelates. As used throughout the present specification and claims, the term "titanium chelate" is intended to mean an organo titanium compound wherein titanium ion is held by coordination bonds. Such titanium chelates are described in the booklet *Versatile TYZOR ® Organic Titanates*, published by E. I. duPont de Nemours & Co., Inc., Wilmington, Del. Preferred titanium chelates are: titanium acetyl acetonate, lactic acid titanium chelate, triethanolamine titanium chelate, tetraoctylene glycol titanium chelate, and mixtures thereof.

ADJUVANTS

Adjuvants such as fillers including carbon black, clay, magnesium silicate, calcium carbonate, silicas, aluminum hydroxide, calcium silicate, etc. may be used with the heat curable polymers of this invention in amounts sufficient to produce the intended effect.

The copolymer may be rendered flame retardant by use of known halogen-containing flames retardant additives, preferably in admixture with an organic or inorganic antimony compound, e.g. antimony oxide.

Additionally, it is believed that compositions containing the present polymer, halogen-containing flame retardant and at least one of CaO, $CaCO_3$, $Ca(OH)_2$, $CaSO_4$, MgO, $MgCO_3$, $Mg(OH)_2$, and $MgSO_4$ would have advantageous properties. The halogen-containing flame retardants include decabromodiphenyl oxide, chlorinated polyethylene, polyvinyl chloride, halogenated paraffin waxes, and the reaction production of tetrabromophthalic acid anhydride and ethylene diamine.

PROCESSING THE INGREDIENTS

Three methods of processing the ingredients are currently known.

(1) The copolymer, difunctional compound and titanate are mixed and heated to a temperature of between the melting temperature of the copolymer and about 200° C. This is preferably accomplished by pre-blending copolymer and difunctional compound in a blender such as a Brabender or Banbury. The difunctional compound is blended with the copolymer in the amount of 0.1 to 10 parts by weight of difunctional compound based on 100 parts by weight of copolymer. Next, the blend is fed to an extruder, and 0.1 to 10 parts by weight of organo titanate, based on 100 parts by weight of copolymer, is injected into the extruder. It is best if the extruder is vented so that volatiles produced during the formation of the heat curable polymer can be removed. The devolatilized heat curable polymer can then be further processed in any desired manner. For example, it may be coated onto a wire or cable. The polymer is then cured by heating it to a temperature of at least about 125° C. and more preferably between 150° C. to 315° C.

(2) A second method of making the heat curable polymer is to first react difunctional compound with from 5 to 1000 parts by weight, based on 100 parts by weight of the difunctional compound, of organotitanate at a temperature of from 25° C. to 250° C., more preferably from 100° C. to 200° C. The reaction is preferably carried out in a solvent, such as benzene. Volatile material is then removed from the reaction product. The devolatilized product may be blended with ethylene homopolymer, rubber or any inert polymer, i.e. any polymer that will not react with the reaction product. This blend provides a useful crosslinking agent that may be stored and later mixed with alkylene-alkyl acrylate copolymer.

This second method has the advantage of not requiring further devolatilization and of avoiding the need to store neat organo titanate, which deteriorates when exposed to atmospheric moisture.

The complete formation of the heat curable polymer, the devolatilized reaction product is blended with alkylene-alkyl acrylate copolymer, in amounts of about 0.1 to about 10 percent by weight, preferably about 0.5 to about 5 percent by weight, based on the weight of the copolymer. The resultant mixture is heated to temperatures on the order of at least about 125° C., preferably about 150° C. to 315° C. to cure or crosslink the copolymer.

(3) A third method is to blend alkylene-alkyl acrylate copolymer, from 0 to 10 parts by weight, based on 100 parts by weight of copolymer, of difunctional compound and from 0.1 to 10 parts by weight, based on 100 parts by weight of copolymer, of titanium chelate. Upon heating at temperatures previously described, the mixture will cure. However, volatile compounds will evolve, so cure must take place at elevated pressure if void-free product is desired. This method has the advantage of not requiring storage of organo titanates, which deteriorates in atmospheric moisture faster than the titanium chelates.

THE CURED PRODUCT

Upon curing, the product formed has at least the following units:

(a) alpha olefin units having the formula:

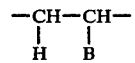

wherein B is selected from the group consisting of hydrogen, $C_1$ to $C_{16}$ alkyl, $C_6$ to $C_{12}$ aryl, $C_7$ to $C_{16}$ alkaryl or combinations thereof, said alpha olefin units being present in the copolymer to the extent of at least 22 weight percent;

(b) cross-linked bridges of the formula:

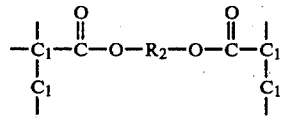

wherein $C_1$ is a carbon atom in a polymer chain, and $R_2$ is a divalent organic radical terminated with other than aryl.

If the preferred difunctional compounds are used, $R_2$ will comprise:

—$(CH_2)$—$_a$ wherein a is an integer of 2 to 20;

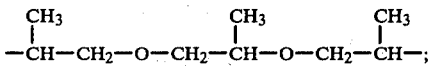

—$CH_2$—$CH_2$—O—$CH_2$—$CH_2$—O—$CH_2$—$CH_2$—;

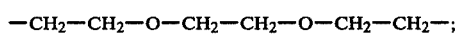

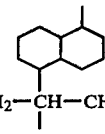

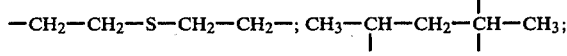

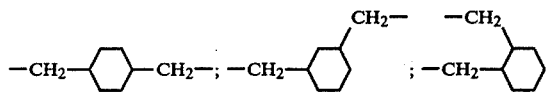

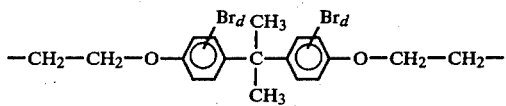

wherein d is an integer of 1 to 4; and

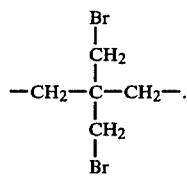

EXAMPLES

The following examples will serve to illustrate the invention.

EXAMPLES 1 TO 4

The ingredients in Table I were blended in a Brabender mixer at a temperature below 125° C.

Each mixture was then pressed into a plaque and subjected to the Monsanto Rheometer cure test. This test procedure is fully set forth in U.S. Pat. No. 4,018,852 issued Apr. 19, 1977, the disclosure of which is incorporated herein by reference. Briefly, FIG. 1 of said patent shows the typical Monsanto Rheometer curve. The cure level (highest cross-link density) is designated as H. It is measured in terms of inch-pounds of torque on the rheometer test equipment. A higher value for H corresponds to a higher cross-link density.

The cured disks from the above test were measured for decalin extractables according to Method A of ASTM D-2765. The decalin insoluble portion of the polyethylene compound is a quantitative measure of its degree of cure. The larger percentage extractables, the lower the degree of cure.

Other specimens were pressed into plaques and cured at 190° C. at 5,000 psig for 15 minutes and tested for tensile strength and elongation under ASTM-D-412-68 and for 60-cycle dielectric constant and dissipation under ASTM-D-150-74. The results appear in Table II.

TABLE I

| | Amount in Mixture, grams | | | |
|---|---|---|---|---|
| Example No. | 1 | 2 | 3 | 4 |
| E/EA copolymer[1] | 198.5 | 198.5 | 198.5 | 198.5 |
| Tetraisopropyl Titanate (TIPT) | 9.9 | 5.94 | 5.94 | 5.94 |
| Decanediol | 13.9 | 8.34 | — | — |
| Dodecanediol | — | — | 10.0 | 10.0 |
| Calcined Clay filler | 83 | 83 | 83 | — |
| Silica filler | | | | 83 |
| Heat Stabilizer[2] | 1.5 | 1.5 | 1.5 | 1.5 |

[1]ethylene-ethyl acrylate copolymer containing 18–20 percent ethyl acrylate, having melt index of 4.5.
[2]flectol H ® available from Vanderbilt Corp, 30 Winfield St., Norwalk, Ct. 06855.

TABLE II

| Example No. | 1 | 2 | 3 | 4 |
|---|---|---|---|---|
| H Value | 89 | 72 | 72 | 80 |
| % Decalin extractables | 4.72 | 7.66 | 7.26 | 5.45 |
| Tensile strength (PSI) | 1450 | 1500 | 1470 | 1240 |
| Elongation | 210 | 257 | 250 | 230 |
| Dielectric constant | 3.313 | 3.256 | 3.284 | 3.318 |
| Dissipation factor | 0.00306 | 0.00270 | 0.00287 | 0.0179 |
| After Aging 1 week at 121° C. | | | | |
| Tensile Strength | 1560 | 1570 | 1600 | 1240 |
| % Elongation | 120 | 177 | 190 | 137 |

The results tabulated above show that the material was crosslinked and displays properties useful as electrical insulation for wire or cable.

EXAMPLES 5 TO 7

The procedure for Example 1 to 4 was repeated using the ingredients shown in Table III.

TABLE III

| | Amount in mixture, grams | | |
|---|---|---|---|
| Example No. | 5 | 6 | 7 |
| Copolymer[1] | 280 | 198.5 | 198.5 |
| TIPT | 13.1 | 6.2 | 6.2 |
| Difunctional compound[2] | 12.1 | 5.75 | 5.75 |
| Talc[4] | — | 83 | — |
| Treated Clay | — | — | 83 |
| Heat Stabilizer[3] | 1.5 | 1.5 | 1.5 |

[1]same copolymer as Example I.
[2]compound having the formula HO—(CH$_2$)$_2$—S—(CH$_2$)$_2$—OH
[3]same heat stabilizer as Example I.
[4]Mistron ZSC ®, Cyprus Industrial Minerals, Trenton, N.J.

Results of tests performed on the material are listed in Table IV.

TABLE IV

| Example No. | 5 | 6 | 7 |
|---|---|---|---|
| H Value | 65 | 53 | 40 |
| Tensile strength (PSI) | 1410 | 1640 | 1630 |
| % Elongation | 370 | 440 | 440 |

These results show that a crosslinked polymer having suitable physical properties was obtained. Notice in particular the surprisingly high elongation obtained with the particular difunctional compound, HO—(CH$_2$)$_2$—S—(CH$_2$)$_2$—OH, used in Examples 5, 6 and 7.

EXAMPLES 8 AND 9

The procedure for Examples 1 to 4 was repeated using the ingredients shown in Table V.

TABLE V

| | Amount in Mixture, grams | |
|---|---|---|
| Example No. | 8 | 9 |
| Copolymer[1] | 265 | 265 |
| TIPT | 7.3 | 4.9 |
| Decanediol | 9.75 | 6.5 |
| Heat Stabilizer[2] | 1.5 | 1.5 |

[1]Ethylene-ethyl acrylate copolymer containing 2 weight % ethyl acrylate, having melt index of 2.
[2]Same heat stabilizer as Example 1.

The material exhibited the properties shown in Table VI.

TABLE VI

| Example No. | 8 | 9 |
|---|---|---|
| Tensile strength (PSI) | 2210 | 2060 |
| % Elongation | 600 | 585 |
| % Decalin extractables[1] | 24.76 | 27.76 |

[1]After curing at 182° C.

The results listed in Table VI show that a crosslinkable polymer is obtained with ethylene-ethyl acrylate copolymer containing only 2% ethyl acrylate.

EXAMPLES 10 TO 14

These examples illustrate the invention using various difunctional compounds, namely, 1,5 pentanediol, 1,5 pentanediol diacetate, 2,5 hexanediol, 1,4 butanediol diadipate, and cyclohexane dimethanol having the formula

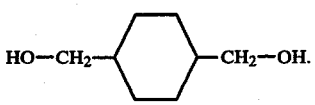

The procedure for Examples 1 to 4 was followed with the ingredients listed in Table VII.

TABLE VII

| Example No. | Amount in Mixture, grams | | | | |
|---|---|---|---|---|---|
| | 10 | 11 | 12 | 13 | 14 |
| Copolymer[1] | 45 | 45 | 45 | 45 | 45 |
| 1,5 Pentanediol | 1.45 | | | | |
| 1,5 Pentanediol diacetate | | 2.62 | | | |
| 2,5 Hexanediol | | | 1.6 | | |
| 1,4 Butanediol diadipate | | | | 4.4 | |
| Cyclohexane dimethanol | | | | | 2.0 |
| TIPT | 1.7 | 1.7 | 1.7 | 1.7 | 0.95 |

[1]Same copolymer as for Example I.

These materials exhibited the results listed in Table VIII.

TABLE VIII

| Example No. | 10 | 11 | 12 | 13 | 14 |
|---|---|---|---|---|---|
| H Value | 36 | 61 | 8 | 8 | 18 |
| % Decalin extractables | 18.26 | 11.32 | 49.11 | 58.06 | 37.5 |

Examples 10 to 14 show that a crosslinked polymer was obtained in all cases.

EXAMPLES 15 TO 18

These examples illustrate practice of the invention using yet another group of difunctional compounds, specifically ethylene glycol, ethylene glycol diacetate, and a brominated diol. The procedure for Examples 1 to 4 was followed with the ingredients in Table IX except as noted.

TABLE IX

| Example No. | Amount in mixture, grams | | | |
|---|---|---|---|---|
| | 15 | 16 | 17 | 18 |
| Copolymer[1] | 45 | 45 | | |
| Copolymer[2] | | | 256.6 | |
| Copolymer Compound[5] | | | | 254.4 |
| Ethylene glycol | 0.5 | | | |
| Ethylene glycol diacetate | | 1.2 | | |
| Brominated diol[4] | | | 35.8 | 25.5 |
| TIPT | 1.0 | 1.0 | 7.0 | 6.6 |
| Heat stabilizer[3] | | | 1.6 | 1.5 |
| Filler[6] | | | 15.8 | 12 |

[1]Same copolymer as Example 1.
[2]Ethylene-ethyl acrylate copolymer containing 15-17 weight percent ethyl acrylate, having melt index of 1.6
[3]Same heat stabilizer as for Example 1.
[4]Compound having the formula:

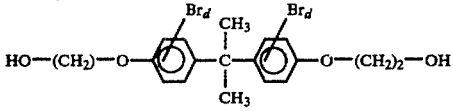

sold under the trade name BA-50 by Great Lakes Chemical Corp. Lafayette, Indiana.
[5]Talc filled polyethylene copolymer containing the co-copolymer of foot note (2) sold under the trade name DFNA-6989 by Union Carbide Corporation, Old Ridgebury Rd., Danbury, Ct.
[6]Superpflex 200 ®, sold by Pfizer Corp., Easton, Pa.

These materials exhibited the results listed in Table X.

TABLE X

| Example No. | 15 | 16 | 17 | 18 |
|---|---|---|---|---|
| H value | 13[1] | 13[1] | — | — |
| Tensile strength (psi) | — | — | 2560 | 1540 |
| % Elongation | — | — | 613 | 347 |
| % Deformation[2] | — | — | 68.5 | 43.4 |

TABLE X-continued

| Example No. | 15 | 16 | 17 | 18 |
|---|---|---|---|---|
| at 121° C. | | | | |

[1]plaque cured at 500° F. before rheometer test,
[2]ASTM-D-621

The results listed in Table X show that a crosslinked copolymer was obtained. It is believed that the brominated difunctional compound of Examples 17 and 18 imparts flame retardancy to those polymers.

EXAMPLES 19 AND 20

Thus far, the examples have shown the embodiment of the invention wherein the copolymer, difunctional compound, and titanate are all mixed and heated to form a heat curable polymer. Examples 19 and 20 illustrate the embodiment of the invention wherein the difunctional compound is prereacted with the titanate, prior to mixing with copolymers.

Five hundred cc of benzene were heated and 50 cc were boiled away to assure dryness. Decanediol (112 g.) was dissolved in the remaining hot benzene and 80 .g of TIPT diluted with 84 cc benzene were added to the benzene-decanediol mixture dropwise over a period of ½ hour. A reaction took place, evidenced by the liberation of heat and build-up of a glassy substance on the bottom of the reactor. The benzene was boiled away and the material, i.e. the TIPT-decanediol adduct, was collected and pulverized. The adduct was mixed with copolymer and other ingredients in the amounts listed in Table XI.

TABLE XI

| Example No. | Amount in Mixture, grams | |
|---|---|---|
| | 19 | 20 |
| Copolymer[1] | 198.5 | |
| Copolymer[2] | | 265 |
| Adduct | 17.3 | 13 |
| Talc[4] | 83 | |
| Heat Stabilizer[3] | 1.5 | 1.5 |

[1]Same copolymer as in Example 1.
[2]Same copolymer as in Example 8.
[3]Same heat stabilizer as in Example 1.
[4]Same filler as Example 6.

The results of testing the compounds are shown in Table XII.

TABLE XII

| Example No. | 19 | 20 |
|---|---|---|
| H valve | 65 | 8 |
| Tensile strength (psi) | 1380 | 1580 |
| % Elongation | 200 | 595 |
| % Decaline extractable | 2.90 | 36 |

The results listed in Table XII shows that a crosslinked polymer was obtained in both cases.

EXAMPLE 21 TO 24

These examples illustrate the embodiment of the invention in which titanium chelate are used. The mixing and testing procedure are the same as those of Example 1.

TABLE XIII

| Example No. | Amount in Mixture, grams | | | |
|---|---|---|---|---|
| | 21 | 22 | 23 | 24 |
| Copolymer[1] | 48 | 48 | 48 | 48 |
| Titanium Acetyl | 3.4 | | | |

TABLE XIII-continued

| | Amount in Mixture, grams | | | |
|---|---|---|---|---|
| Example No. | 21 | 22 | 23 | 24 |
| Acetonate Triethanolamine Titanium chelate | | 4.1 | | |
| Tetraoctylene glycol Titanium chelate | | | 4.3 | |
| Lactic acid titanium chelate | | | | 2.4 |
| Decanediol | 2.8 | 2.8 | 2.8 | 2.8 |

(1)Same copolymer as Example 1.

The compounds were tested. The results are listed in Table XIV.

TABLE XIV

| Example No. | 21(1) | 22(1) | 23(2) | 24(1) |
|---|---|---|---|---|
| H-Value | 86 | 86 | 65 | 95 |
| % decalin extractable | 6.62 | 8.18 | 7.88 | 4.15 |

(1)Compound was pressed and cured at 500° F.
(2)Compound was pressed and cured at 600° F.

The data in Table XIV indicate that a cross-linked polymer was obtained in Examples 21 to 24.

EXAMPLES 25 TO 27

In Example 25, the diol, i.e. the difunctional compound, was generated in situ by the chelate. In Example 26, the chelate was generated in situ from TIPT and triethanolamine, forming triethanolamine titanium chelate. In Example 27, the tetraoctylene glycol titanium chelate was formed in situ from 2-ethyl-1,3-hexane diol and TIPT.

TABLE XV

| | Amount in Mixture, grams | | |
|---|---|---|---|
| Example | 25 | 26 | 27 |
| Copolymer(1) | 338 | 338 | |
| Copolymer(2) | | | 250 |
| 2-ethyl-1,3-hexanediol | | | 23.24 |
| Titanium chelate | 16.2(3) | | |
| Decanediol | | 10.5 | |
| TIPT | | 7.6 | 11.31 |
| Triethanol amine | | 7.83 | |
| Heat Stabilizer(4) | 1.7 | 1.7 | 1.5 |

(1)Same copolymer as Example 1.
(2)Ethylene-ethyl acrylate copolymer containing 14% ethyl acrylate, having melt index of 2.0.
(3)Same chelate as Example 23.
(4)Same heat stabilizer as Example 1.

The results of testing the compound after curing at high temperatures are listed in Table VI.

| Example | 25(1) | 26(2) | 27(1) |
|---|---|---|---|
| H valves | 17.5 | 77 | 11.2 |
| % Decalin extractables | 24.2 | 7.52 | 30.8 |

(1)Cured at 600° F.
(2)Cured at 500° F.

The results show that in Examples 25 to 27, all performed in accordance with the invention, a crosslinked polymer was obtained.

It is to be understood that the disclosure of my co-pending application Ser. No. 106,502 is incorporated herein by reference.

What is claimed is:

1. A curable mixture comprising an alkylene-alkyl acrylate copolymer and a crosslinking agent which is the reaction product of a mixture containing a difunctional compound having the formula:

wherein $R_1$ and $R_3$ are independently selected from the group consisting of —OH, —SH, and

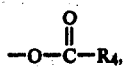

wherein $R_4$ is $C_1$ to $C_{20}$ hydrocarbon; $R_2$ is a divalent organic radical terminated with other than aryl and from 5 to 1000 parts by weight, based on 100 parts by weight of said difunctional compound, of an organo titanate.

2. A curable mixture as defined in claim 1 wherein the crosslinking agent is the reaction product of a mixture containing a difunctional compound as defined in claim 1 and the organo titanate is selected from the group consisting of tetramethyl titanate, tetraethyl titanate, tetraisopropyl titanate, tetrabutyl titanate, tetraoctyl titanate, tetrastearyl titanate, isopropyl tri(lauryl-myristyl) titanate and combinations thereof.

3. A curable mixture as defined in claim 1 wherein the crosslinking agent is the reaction product of an organo titanate and a difunctional compound selected from the group consisting of:

HO—(CH$_2$)$_a$—OH, wherein a is an integer of 2 to 20;

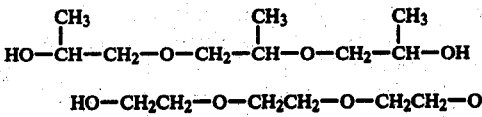

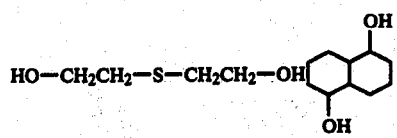

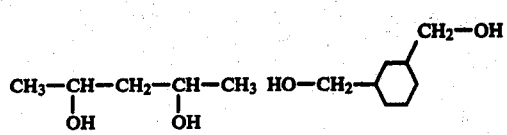

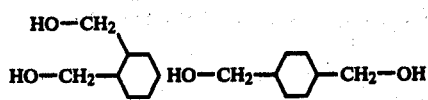

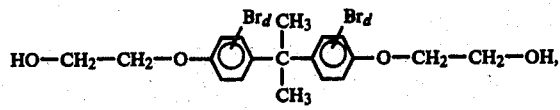

wherein d is an integer of 1 to 4;
dibromoneopentyl glycol; and

wherein e is an integer of 2 to 10, and f and g are integers of 0 to 18.

4. A curable mixture as defined in claim 3 wherein the crosslinking agent is the reaction product of a mixture containing decane diol and tetraisopropyl titanate.

5. The cured product of the mixture defined in claim 1.

6. An electrical conductor coated with the curable mixture or cured product of the curable mixture defined in claim 1.

7. A process for making a heat curable polymer comprising the steps of:
(a) reacting difunctional compound having the formula:

$$R_1—R_2—R_3$$

wherein $R_1$ and $R_3$ are independently selected from the group consisting of —OH, —SH,

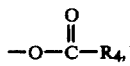

wherein $R_4$ is $C_1$ to $C_{20}$ hydrocarbon; $R_2$ is a divalent organic radical terminated with other than aryl with from 5 to 1000 parts by weight, based on 100 parts by weight of the difunctional compound, of organo titanate at a temperature of from 25° C. to 250° C.
(b) removing the volatile material from the step (a) reaction product, and
(c) mixing the devolatilized reaction product with alkylene-alkyl acrylate copolymer.

8. The process of claim 7 wherein the step (a) reaction is carried out at a temperature of from 100° C. to 200° C.

9. The process of claim 7 wherein the step (a) reaction is carried out in the presence of solvent.

10. The process of claim 9 wherein the step (a) reaction is carried out at a temperature of from 100° C. to 200° C.

11. A process for preparing a heat-curable polymer comprising the steps of mixing
(a) alkylene-alkyl acrylate copolymer,
(b) from 0 to 10 parts by weight, based on 100 parts by weight of the copolymer, of difunctional compound having the formula $$R_1—R_2—R_3$$

wherein $R_1$ and $R_3$ are independently selected from the group consisting of —OH, —SH,

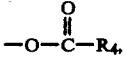

wherein $R_4$ is $C_1$ to $C_{20}$ hydrocarbon; $R_2$ is a divalent organic radical terminated with other than aryl,
(c) from 0.1 to 10 parts by weight, based on 100 parts by weight of copolymer, of titanium chelate.

12. The process of claim 11 wherein the titanium chelate is selected from the group consisting of: titanium acetyl acetonate, lactic acid titanium chelate, triethanolamine titanium chelate, tetraoctylene glycol titanium chelate, and mixtures thereof.

13. A heat curable polymer prepared as defined in claim 11.

14. A crosslinked copolymer comprising:
(a) alpha olefin units having the formula:

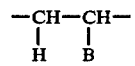

wherein B is selected from the group consisting of hydrogen, $C_1$ to $C_{16}$ alkyl, $C_6$ to $C_{12}$ aryl, $C_7$ to $C_{16}$ alkaryl or combinations thereof, said alpha olefin units being present in the copolymer to the extent of at least 22 weight percent;
(b) crosslinked bridges of the formula:

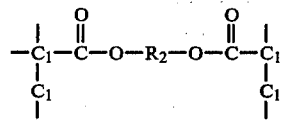

wherein $C_1$ is a carbon atom in a polymer chain, and $R_2$ is a divalent organic radical terminated with other than aryl.

15. The crosslinked copolymer of claim 12 wherein $R_2$ is selected from the group consisting of: —(CH$_2$)—$_a$ wherein a is an integer of 2 to 20;

$$—CH—CH_2—O—CH_2—CH—O—CH_2—CH;$$
$$\phantom{—}CH_3 \phantom{—CH_2—O—CH_2—}CH_3 \phantom{—O—CH_2—}CH_3$$

—CH$_2$—CH$_2$—O—CH$_2$—CH$_2$—O—CH$_2$—CH$_2$
CH$_2$—CH$_2$—S—CH$_2$—CH$_2$—;

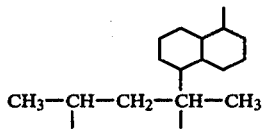

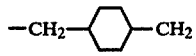

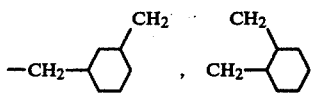

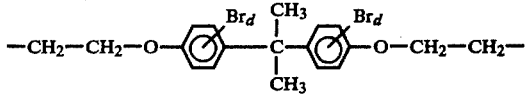

wherein d is an integer of 1 to 4;

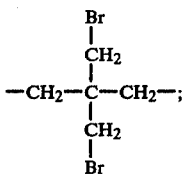

and combinations thereof.

* * * * *

UNITED STATES PATENT AND TRADEMARK OFFICE
CERTIFICATE OF CORRECTION

PATENT NO. : 4,444,957

DATED : April 24, 1984

INVENTOR(S) : Michael J. Keogh

It is certified that error appears in the above-identified patent and that said Letters Patent is hereby corrected as shown below:

Column 6, line 5; "terms" should read -- term --

Column 7, line 2, "production" should read -- product --

Column 7, line 48, "The complete" should read -- To complete --

Column 7, line 67, "deteriorates" should read -- deteriorate --

Column 9, line 40, "flectol H" should read -- Flectol H --

Column 10, line 6, "Example I" should read -- Example 1 --

Column 10, line 8, "Example I" should read -- Example 1 --

Column 11, line 14, "Example I" should read -- Example 1 --

Column 12, line 50, "H valve" should read -- H value --

Column 13, line 18, "H-valve" should read -- H value --

Column 13, line 55, "H valves" should read -- H value --

Column 14, lines 40-44 should read:

-- $HO-CH_2CH_2-S-CH_2CH_2-OH$, 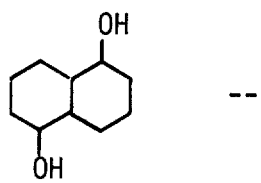 --

UNITED STATES PATENT AND TRADEMARK OFFICE
CERTIFICATE OF CORRECTION

PATENT NO. : 4,444,957
DATED : April 24, 1984
INVENTOR(S) : Michael J. Keogh

It is certified that error appears in the above-identified patent and that said Letters Patent is hereby corrected as shown below:

Column 14, lines 45-49 should read:

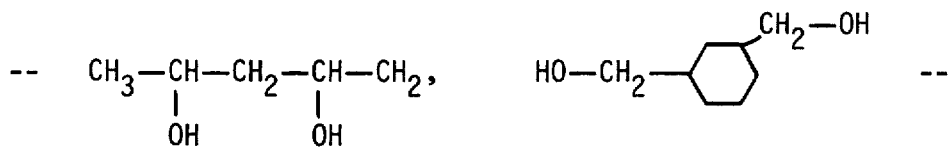

Column 14, lines 50-53 should read:

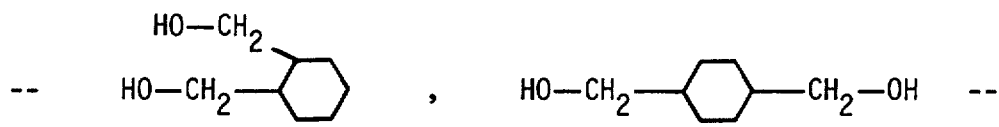

Column 16, line 27, "$-(CH_2)-a$" should read -- $-(CH_2)_a-$ --

Signed and Sealed this

Thirteenth Day of November 1984

[SEAL]

Attest:

GERALD J. MOSSINGHOFF

Attesting Officer    Commissioner of Patents and Trademarks